G. T. SUNDHOLM.
LAWN TRIMMER.
APPLICATION FILED NOV. 7, 1916.
1,238,595.
Patented Aug. 28, 1917.
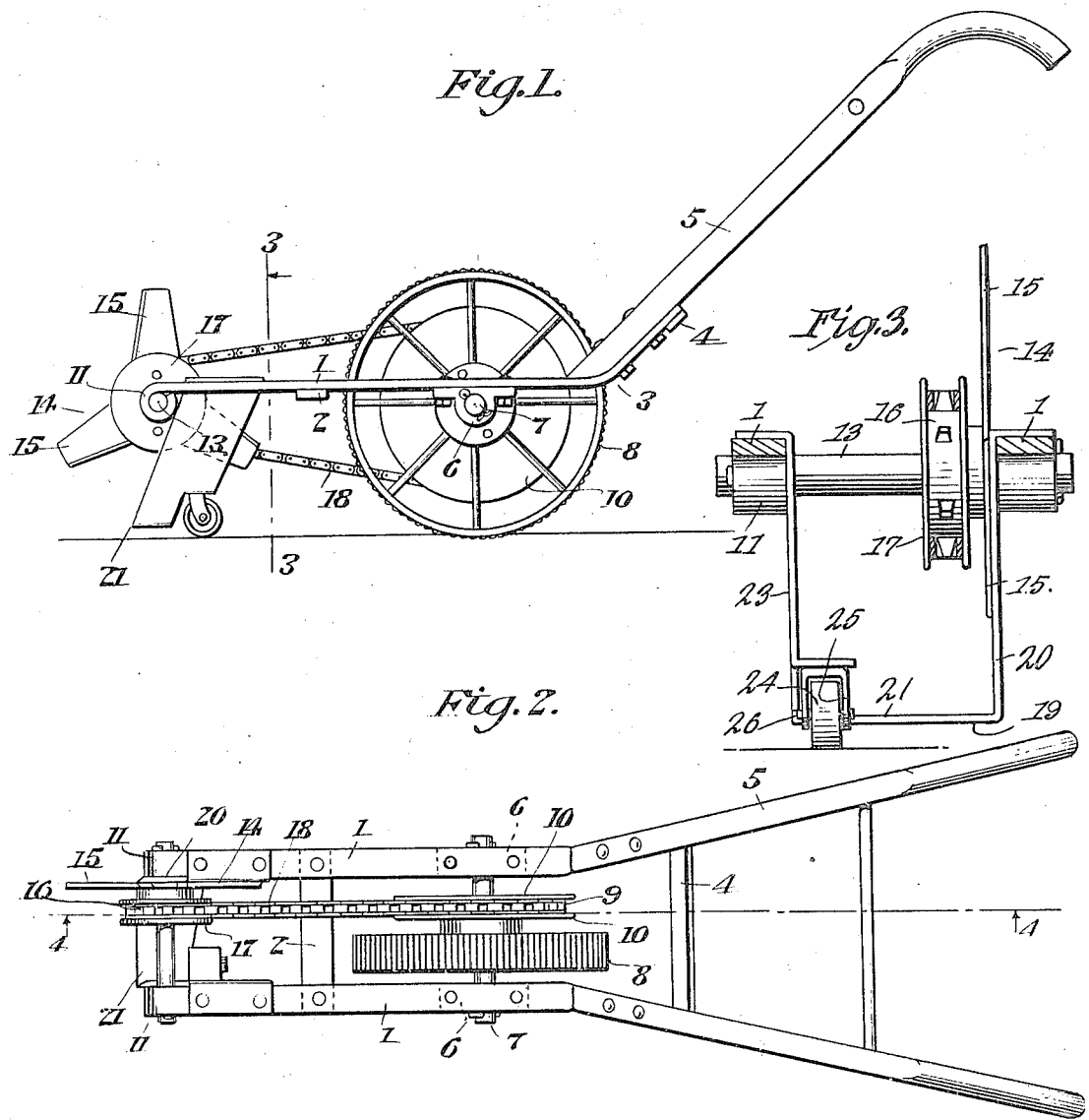
Inventor
Gunnar T. Sundholm
Witness
By Victor J. Evans
Attorney

UNITED STATES PATENT OFFICE.

GUNNAR T. SUNDHOLM, OF GARRISON, NEW YORK.

LAWN-TRIMMER.

1,238,595.     Specification of Letters Patent.     Patented Aug. 28, 1917.

Application filed November 7, 1916. Serial No. 130,008.

*To all whom it may concern:*

Be it known that I, GUNNAR T. SUNDHOLM, a citizen of the United States, residing at Garrison, in the county of Putnam and State of New York, have invented new and useful Improvements in Lawn-Trimmers, of which the following is a specification.

This invention relates to lawn trimmers and has for its object to provide a machine by means of which grass at the edges of curbing or sidewalks may be easily trimmed.

The machine is primarily adapted for use in cutting edges of a lawn at the groove or trench which is usually provided in the lawn adjacent the edge of a sidewalk or the like, and a further object of the invention is to produce a machine of this class which will not only cut the grass at the edge of the trench but will loosen and aid in removing any substance gathered in the trench.

It is a still further object of the invention to provide a lawn trimmer which may be employed for excavating a trench in a line with the edge of the lawn cut by the trimmer.

With the above and other objects in view the improvement resides in the construction, combination and arrangement of parts set forth in the following specification and falling within the scope of the appended claim.

In the drawings:

Figure 1 is a side elevation of a lawn trimmer constructed in accordance with the present invention, Fig. 2 is a top plan view of the same, and Fig. 3 is a transverse sectional view approximately on the line 3—3 of Fig. 1.

In constructing the improvement I provide a frame preferably formed of two parallel bars 1—1 suitably connected adjacent the center thereof, as indicated by the numeral 2, while the said bars, at one of the ends thereof, are bent angularly, as at 3, and these angular ends may be also connected by transverse members 4. Secured to each of the angular ends 3 of the bars 1 is a handle member 5, and the said handles are provided with transverse bracing and connecting elements.

The bars 1, adjacent to the handle end of the device are provided upon their outer faces with a pair of alining bearings 6—6 within which is journaled a shaft 7, and keyed to this shaft, adjacent one of the bars 1 is the ground wheel 8. Also secured upon the shaft 7 to one of the sides of the wheel 8 is a sprocket wheel 9 which has its opposite faces preferably provided with guide disks 10—10 which are of a greater cross sectional diameter than that of the sprocket wheel and consequently inclose the teeth of said sprocket wheel.

The free ends of the bars 1 comprising the frame are provided with bearings 11 which aline and which are adapted to provide journals for a shaft 13. Secured to this shaft is a rotary cutter 14, the same being arranged adjacent to one of the bearings 11 and being disposed adjacent to the bar nearest which the ground wheel 8 is arranged. The rotary cutter, in the present instance, provides three radially disposed blades 15—15 centrally connected to a suitable hub that is keyed upon the shaft 13. The blades are preferably removable from the hub, so as to facilitate the ease in the sharpening of the blades. Secured to the hub of the rotary cutter member 14, or if desired keyed upon the shaft 13 is a sprocket wheel 16 of a smaller size than the sprocket wheel 9, and the said sprocket may be and preferably has its opposite faces provided with guide disks 17 of a greater cross sectional diameter than that of the sprocket wheel 16 and consequently inclosing the teeth of the said sprocket wheel 16. Trained around the sprocket wheels 16 and 9 is an endless chain 18 which co-engages with the teeth of the said wheels and which, of course, when the ground wheel is turned will revolve the shaft 13 and consequently the rotary cutter 14.

Arranged upon the forward end of the frame to the rear of the bearings 11 and depending from the said frame is a plow member 19. This plow is of a peculiar construction, inasmuch as one of the side members thereof, indicated for distinction by the numeral 20, is provided with a knife edge and is disposed adjacent the blades of the rotary cutter whereby the grass being received between the knife edge of the member 20 will be engaged by the blades of the rotary cutter and be readily separated. From the lower end of the knife 20 is arranged a right angular extension which may be also in the form of a cutting blade and which is indicated by the numeral 21. The outer side member 23 of the plow may also have its outer edge sharpened but the said member, upon its lower and inner corner, is provided with a depressed or cut-away portion to receive a colter or guide roller 24. The roller is arranged in a suitable housing 25 and has its shaft 26 journaled in the inner wall provided by the said housing.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

In a device of the class set forth, the combination with a pair of spaced parallel connected bars and handle members secured to the said bars, a shaft journaled in bearings between the bars, a ground wheel upon the shaft, a sprocket wheel upon the shaft, said bars having their outer ends formed with bearings, a shaft in these bearings, a cutter wheel secured to the shaft, a sprocket wheel upon the shaft, an endless chain trained over this sprocket wheel and the first referred to sprocket member, a plow member secured to the bearings and including parallel sides having their outer ends shortened, a connecting member for the sides at the bottom thereof, and having its outer end shortened, one of said sides at the inner corner, thereof being cut away, a housing arranged in the said cut away portion, and a roller journaled upon a shaft supported in the said housing.

In testimony whereof I affix my signature.

GUNNAR T. SUNDHOLM.